United States Patent [19]
Svenning

[11] Patent Number: 5,649,392
[45] Date of Patent: Jul. 22, 1997

[54] WIND-POWER PLANTS

[76] Inventor: Sven Svenning, S-51013, Bjorketorp, Sweden

[21] Appl. No.: 393,164

[22] Filed: Feb. 21, 1995

Related U.S. Application Data

[63] Continuation of Ser. No. 30,451, May 24, 1993, abandoned.

[30] Foreign Application Priority Data

Oct. 4, 1990 [SE] Sweden ................... 9003166

[51] Int. Cl.$^6$ ................... E04B 1/346; E04H 5/02
[52] U.S. Cl. ................... 52/66; 52/68; 52/69
[58] Field of Search ................... 52/64, 66, 68, 52/69, 40; 296/108, 165, 168, 169, 173, 174; 220/4.21, 4.24, 4.25, 252, 262, 263, 264, 4.22, 4.23

[56] References Cited

U.S. PATENT DOCUMENTS

| | | | |
|---|---|---|---|
| 3,338,003 | 8/1967 | Smith | 52/69 |
| 3,790,207 | 2/1974 | Anderson | 52/66 |
| 4,255,911 | 3/1981 | Beacom et al. | 52/66 |
| 4,311,434 | 1/1982 | Abe . | |
| 4,585,915 | 4/1986 | Moore | 220/252 |

FOREIGN PATENT DOCUMENTS 906264 3/1954 Germany ................... 52/69

*Primary Examiner*—Michael Safavi
*Attorney, Agent, or Firm*—Dvorak and Traub

[57] ABSTRACT

An improvement for allowing service jobs to be performed on and around the tower top of wind-power plants, where it is very important that sufficient space is available to the personnel for the tools and the machine parts during service and maintenance jobs on the machinery and the turbine. At least one section (1) of the engine hood is articulated to an engine support floor (3) with the aid of a hinge connection (4), thus allowing the hood section (1) to be folded outwards and downwards to assume a horizontal position wherein it serves as a floor.

19 Claims, 1 Drawing Sheet

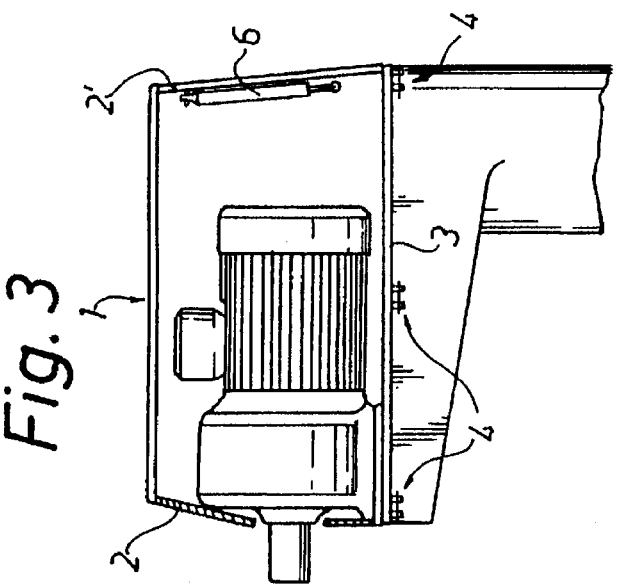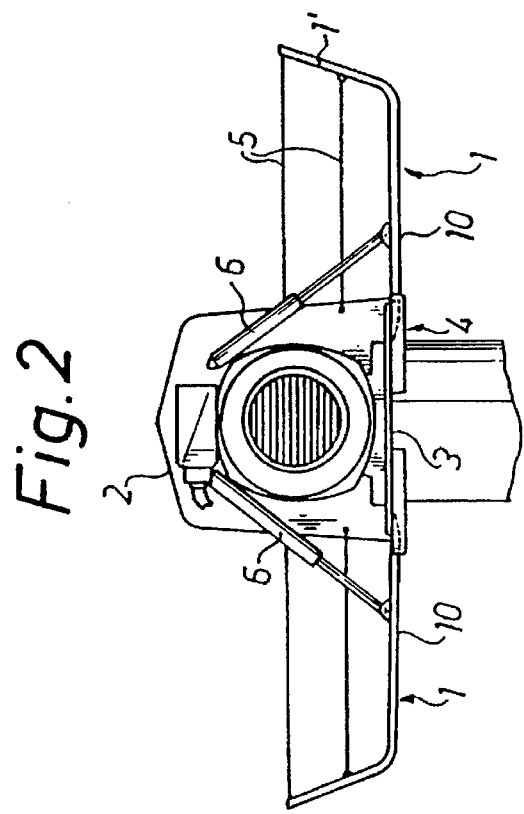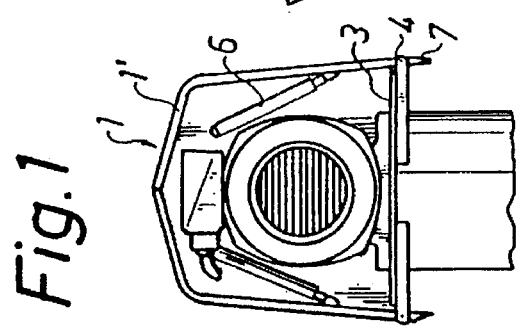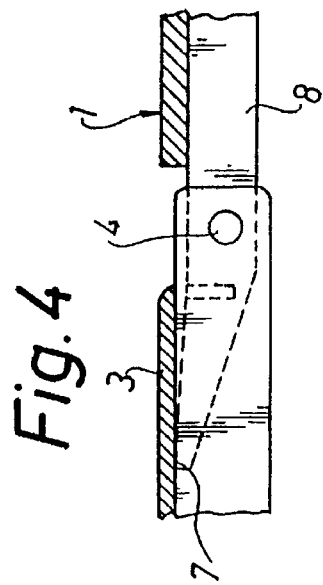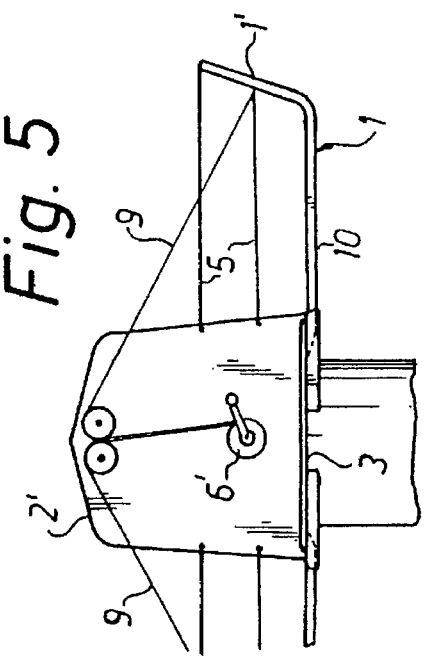

WIND-POWER PLANTS

This application is a continuation of application Ser. No. 08/030,451, now abandoned, filed on May 24, 1993, entitled "AN IMPROVEMENT IN WIND-POWER PLANTS".

The subject invention concerns an improvement in wind-power plants of the kind having an engine house fitted with a hood at least one section of which is arranged to be opened.

When service jobs are to be performed in the engine house or in areas close to the turbine hub, considerable space is required, both to perform the work operations proper and to temporarily store machine parts and tools. This space requirement causes considerable problems in the case of engine houses having an optionally reduced size for which the demands that the engine-house surfaces emit a minimum amount of sound and that the costs be low, are quite considerable. Hitherto, only the top or roof sections of the hood have been constructed so as to allow them to be opened, and although this arrangement provides the workmen with sufficient headroom it does not satisfy the need for sufficient floor space in the case of compact cost-effective engine houses. Large-size engine houses furthermore are an obstruction in the carrying out of service jobs on the turbine-blade parts that are positioned close to the hub.

The purpose of the invention is to suggest an improvement by means of which the very hood of the engine house may serve as a floor surface including protective railing.

This purpose has been achieved in accordance with the invention in that the hood section is foldable in an outwards and downwards direction in such a manner that at least a part of the hood section assumes a horizontal position. End-position means, such as a protective railing arranged to be automatically extended from the end walls of the hood, maintain the floor area in the horizontal position. The hood section includes an outer portion which is bent upwards and which forms the protective railing when the hood sections assumes its outer position, and the hood ceiling when the hood section is closed. When the hood sections are heavy, actuating means are required to perform folding operations. The actuating means may, for instance, be in the form of lifting jacks or winches arranged to maintain the hood section in the desired position when they assume their end positions. A vital safety lock is formed by a hinge connection by means of which the hood section is hingedly attached to the engine support floor, in that said hinge connection is fitted with abutment means restricting the extent of its angular movements.

The invention will be described in closer detail in the following with reference to the accompanying drawings, wherein FIG. 1 illustrates a engine-house hood from which the nearby end wall has been removed to illustrate the minimum dimension requirement of the hood in closed position, FIGS. 2 and 5 illustrate the hood in the open, outwardly folded position and show the protective railing in extended position as well as the actuating means, FIG. 3 is a lateral view of the hood with the nearby end wall having been removed therefrom, and FIG. 4 illustrates a hinged connection including a movement-limiting abutment means.

In the drawings, numeral reference 1 designates two engine hood sections which are arranged to be opened, numeral reference 4 designates the hinge connection by means of which the hood sections are articulated to the engine support floor 3, and reference numerals 2 and 2' designate the respective hood end walls which are integrally attached to the support floor 3.

Actuating means, in accordance with FIGS. 1 and 2 in the shape of actuating lifting jacks 6, are connected to their respective hood section 1 and end wall 2.

An outer portion 1' of the hood section 1, which portion is bent heavily upwards, also serves as a protective railing whereas wires 5 serve the same purpose at the end walls of the hood.

A wall frame element 8, illustrated in FIG. 4, extends beyond the hinge connection 4 up to a movement-restriction abutment means 7 in abutment against the floor 3. The foregoing structures define integral end position limiting means of the actuating means 6, 6'.

In accordance with FIG. 5, the lifting jacks 6 are replaced by winches 6' acting on wires 9 to raise and lower the associated hood section 1.

Consequently, each hood section 1 may be folded outwards in such a manner that at least one portion 10 thereof assumes a horizontal position, in which position it forms a floor, providing the workmen with adequate and safe working space for service jobs while at the same time the floor may be used for temporary storage of machine parts and tools.

I claim:

1. An engine house for wind-power plants, comprising:
    an engine support floor having opposing side portions and opposing end portions; and
    a mating hood section movable coupled to each of the side portions of the engine support floor, each hood section having a side portion and a top portion, the side portion of the hood section having a frame element hingedly coupled to the side portion of the engine support floor, the top portion of the hood section having a mating side, the mating hood sections being closable in a closed mating position, wherein the mating side of the top portions of the hood sections mate to form a closed house over the engine support floor, the mating hood sections being openable, from the closed mating position, in an outward and downward direction to an open position, wherein the side portions of the hood sections and the engine support floor are in a substantially common plane to provide a working platform, the frame element having movement restriction abutment means that abut a lower surface of the engine support floor when each hood section is in the open position, wherein the movement restriction means supports the mating hood section in the open position.

2. An engine house as claimed in claim 1, wherein each hood section is hingedly suspended from an engine support floor by a hinge extending through the frame element.

3. An engine house as claimed in claim 1, wherein each mating hood section is a unitary body, and wherein the top portion and the side portion are defined by a bend in each mating hood section.

4. An engine house as claimed in claim 1, further comprising an end wall coupled to each of the opposing end portions of the engine support floor, and a protective railing coupled to the end wall and each mating hood section, the protective railing tensioned by the hood section when each hood section is in the open position.

5. An engine house as claimed in claim 1, further comprising an end wall coupled to each of the opposing end portions of the engine support floor, and actuating means coupled to the end wall and each mating hood section for raising and lowering the hood section.

6. An engine house as claimed in claim 2, wherein each mating hood portion is a unitary body, and wherein the top portion and the side portion are defined by a bend in each mating hood section.

7. An engine house as claimed in claim 2, further comprising an end wall coupled to each of the opposing end portions of the engine support floor, and a protective railing coupled to the end wall andthe mating hood section, the protective railing tensioned by the hood section when each hood section is in the open position.

8. An engine house as claimed in claim 3, further comprising an end wall coupled to each of the opposing end portions of the engine support floor, and a protective railing coupled to the end wall and each mating hood section, the protective railing tensioned by the hood section when each hood section is in the open position.

9. An engine house as claimed in claim 6, further comprising an end wall coupled to each of the opposing end portions of the engine support floor, and a protective railing coupled to the end wall and each mating hood section, the protective railing tensioned by the hood section when each hood section is in the open position.

10. An engine house as claimed in claim 2, wherein actuating means for raising and lowering each hood section are formed with integral end-position limiting means arranged to maintain the associated hood section in a desired end position thereof.

11. An engine house as claimed in claim 3, wherein actuating means for raising and lowering each hood section are formed with integral end-position limiting means arranged to maintain the associated hood section in a desired end position thereof.

12. An engine house as claimed in claim 4, wherein actuating means for raising and lowering each hood section are formed with integral end-position limiting means arranged to maintain the associated hood section in a desired end position thereof.

13. An engine house as claimed in claim 6, wherein actuating means for raising and lowering each hood section are formed with integral end-position limiting means arranged to maintain the associated hood section in a desired end position thereof.

14. An engine house as claimed in claim 7, wherein actuating means for raising and lowering each hood section are formed with integral end-position limiting means arranged to maintain the associated hood section in a desired end position thereof.

15. An engine house as claimed in claim 8, wherein actuating means for raising and lowering each hood section are formed with integral end-position limiting means arranged to maintain the associated hood section in a desired end position thereof.

16. An engine house as claimed in claim 9, wherein actuating means for raising and lowering each hood section are formed with integral end-position limiting means arranged to maintain the associated hood section in a desired end position.

17. An engine house as claimed in claim 5, wherein the actuating means comprise a winch acting on wires coupled to one of the end walls and each of the mating hood sections to raise and lower the associated hood section.

18. An engine house as claimed in claim 5, wherein the actuating means comprise an actuating lifting jack coupled to one of the end walls and each of the mating hood sections to raise and lower the associated hood section.

19. An improvement in a wind-power plant having an engine and an engine house provided with a support floor, an end wall extending upwardly from said support floor, said end wall having an opening through which a shaft of the engine extends, at least one hood section hinged to a lateral side of said support floor, said hood section having an outer portion to abut the top of said end wall and a floor portion to abut the vertical side of said end wall when the hood encloses the engine, and actuating means between said end wall and said hood for moving said hood to an open position to align the floor portion of the hood with the support floor to provide a working platform and to position the outer portion of the hood to provide a protective railing for workmen.

* * * * *